United States Patent [19]
Crampton et al.

[11] Patent Number: 5,890,661
[45] Date of Patent: Apr. 6, 1999

[54] COLLIDING STREAM SPRAY DISPENSING SYSTEM WITH A MOLDABLE NOZZLE

[75] Inventors: David C. Crampton, Fountain Valley, Calif.; Robert Smith, Ballwin, Mo.

[73] Assignee: Par-Way Group, St. Clair, Mo.

[21] Appl. No.: 757,924

[22] Filed: Nov. 27, 1996

[51] Int. Cl.$^6$ .................................................. B05B 1/26
[52] U.S. Cl. ........................ 239/544; 239/333; 239/337
[58] Field of Search .............................. 239/333, 337, 239/373, 433, 434, 543, 544, 545

[56] References Cited

U.S. PATENT DOCUMENTS

| | | | |
|---|---|---|---|
| 2,785,926 | 3/1957 | Lataste | 239/543 X |
| 3,730,437 | 5/1973 | Rousselot | 239/544 X |
| 4,790,485 | 12/1988 | Yamamoto | 239/543 X |
| 5,080,286 | 1/1992 | Morrison | 239/543 X |
| 5,088,649 | 2/1992 | Hanson et al. | 239/543 X |
| 5,249,747 | 10/1993 | Hanson et al. | 239/544 X |
| 5,358,179 | 10/1994 | Lund et al. | 239/544 X |

FOREIGN PATENT DOCUMENTS

| | | | |
|---|---|---|---|
| 934565 | 9/1946 | France | 239/544 |
| 624803 | 5/1947 | United Kingdom | 239/544 |

*Primary Examiner*—Andres Kashnikow
*Assistant Examiner*—Steven J. Ganey
*Attorney, Agent, or Firm*—James A. Quinton

[57] ABSTRACT

A multiple hole, preferably a two hole spray dispensing system and sprayer in which colliding streams of viscous liquid are dispensed to the atmosphere are provided. The spray dispenser includes a reservoir for storing a fluid product. An aerosol or manually pressurized dispensing system preferably a hand held dispensing system may be used. Liquid is delivered from the reservoir under pressure to a delivery passageway. A nozzle having two or more outlets to the atmosphere is mounted to the delivery passageway to provide colliding streams of fluid.

29 Claims, 15 Drawing Sheets

4,890,661

COLLIDING STREAM SPRAY DISPENSING SYSTEM WITH A MOLDABLE NOZZLE

TECHNICAL FIELD

The field of the invention is a dispensing system for high viscosity liquid products. More particularly, the present invention provides an improved hand held spray dispenser which has a nozzle having two or more outlets for delivering fluid on colliding paths.

BACKGROUND ART

Highly viscous liquids have posed a dispensing problem in the art. Vegetable oil containing products have been particularly troublesome. Considerable efforts have been made to provide spray dispensable viscous vegetable oil compositions. These compositions may contain other viscous vegetable based products such as lecithin. These products have been dispensed in aerosol form, generally using a propellant which will mix with the viscous vegetable oil and reduce the viscosity. This has resulted in the use of chlorofluorohydrocarbons (CFCs) propellant. Alternatively, volatile organic compounds (VOCs) such as isobutane or propane have been used. Such propellants are now considered environmentally unacceptable. Pump sprayable dispensing systems for viscous vegetable oil have also generally required dilution of the vegetable oil to reduce its viscosity.

Pump sprayable dispensing systems for viscous liquids have consequently been developed. For example, U.S. Pat. No. 5,088,649 describes a colliding stream hand pump sprayer which can dispense a fine spray of viscous liquids without the need for using diluents. U.S. Pat. No. 5,358,179 discloses a colliding stream sprayer having a molded nozzle. However, the manufacture of such devices can be cumbersome. In manufacture, the two outlets which provide the colliding streams have to be either drilled after molding of the nozzle or formed during injection molding by using releasable pins. Use of molding pins to provide outlet passageways in a nozzle having colliding outlet streams can be problematic. Since the path of the streams intersect, the pins can interfere with one another and be difficult if not impossible to remove. Thus it is desirable to provide a moldable nozzle having two or more colliding streams without using molding pins.

Aerosol containers also have been described in the prior art having colliding streams which improve the break up of viscous fluid. For example, U.S. Pat. No. 5,249,747 describes such a system which uses compressed gases as propellants instead of a CFC or VOC propellant. However, the quantity of liquid product dispensed and the quality of the spray pattern are important. In the prior art, there can be uneven distribution of the viscous liquid and undesirable heavy concentration areas from the colliding stream sprayers.

Accordingly, it would be desirable to provide a hand held dispensing system for viscous liquids which would provide an improved spray pattern which would eliminate any undesirable concentration of product and provide for more even distribution.

DISCLOSURE OF THE INVENTION

The present invention relates to an improved viscous liquid dispensing system. The invention also relates to an apparatus for dispensing viscous liquids without the need to use diluents or VOC or CFC propellants.

It is an object of the invention to provide a viscous liquid dispensing system which can dispense viscous coatings in a fine mist.

It is an object of the invention to provide an aerosol dispensing system which can use compressed gases such as nitrogen, carbon dioxide, nitrous oxide or a noble gas as propellant, while still providing a finely atomized product. Compressed gases as denoted by the aerosol industry are defined as a gas that can be liquified only by the application of very low temperatures or very high pressure. Compressed gases include carbon dioxide, nitrous oxide and nitrogen. Freon, butane, and pentane are not considered compressed gas propellants.

It is an object of the invention to provide a viscous liquid dispensing system which provides a uniform fine spray and which has minimal areas of heavy concentration of liquid.

It is an object of the invention to provide a two hole spray dispensing system with intersecting outlet streams having a nozzle which can be injection molded without the use of pins to mold the two hole passageways.

It is an object of the invention to provide a single piece injection molded nozzle having two or more discharge outlets having colliding outlet streams without the use of molding pins to provide the outlet streams.

Other further objects will become apparent from the specification drawings and claim.

According to the invention, a multiple hole, preferably a two hole spray dispensing system and a sprayer in which colliding streams of viscous liquid are dispensed to the atmosphere are provided. The spray dispenser according to the invention includes a reservoir for storing a fluid product. An aerosol or manually pressurized dispensing system preferably a hand held dispensing system may be used. Liquid is delivered from the reservoir under pressure to a delivery passageway. A nozzle having two or more outlets to the atmosphere is mounted to the delivery passageway to provide colliding streams of fluid.

The nozzle has a nozzle inlet passageway which terminates in a shaped surface preferably formed by intersecting faces for example a cone shaped surface or wedge shaped surface formed by intersecting planes. Two tapered passageways are located on opposite sides of the intersecting faces. Tapered passageway inlets provide fluid communication between the tapered passageways and the nozzle inlet passageway. Nozzle outlets are located on the tapered passageway end opposite the inlets of the tapered passageways for discharge of pressurized liquid in colliding streams. The viscous liquid exiting from one orifice collides at a preselected collision point with the viscous liquid exiting from the other orifice.

In another aspect of the invention, a method of manufacture of a single piece nozzle having two outlets which produce colliding outlet streams is provided. In addition according to the invention, a mold for making a multiple outlet spray nozzle having colliding exit streams without the use of molding pins is provided.

The dispensing system delivers viscous liquids in a fine mist with even distribution and a reduction in the areas of undesirable high concentration spots. In addition, the nozzle according to the invention can be manufactured by injection molding in a single piece without the use of molding pins or without drilling.

The preferred embodiment of the present invention is illustrated in the drawings and examples. However, it should be expressly understood that the present invention should not be limited solely to the illustrative embodiment.

DETAILED DESCRIPTION OF THE INVENTION

Figure 1:
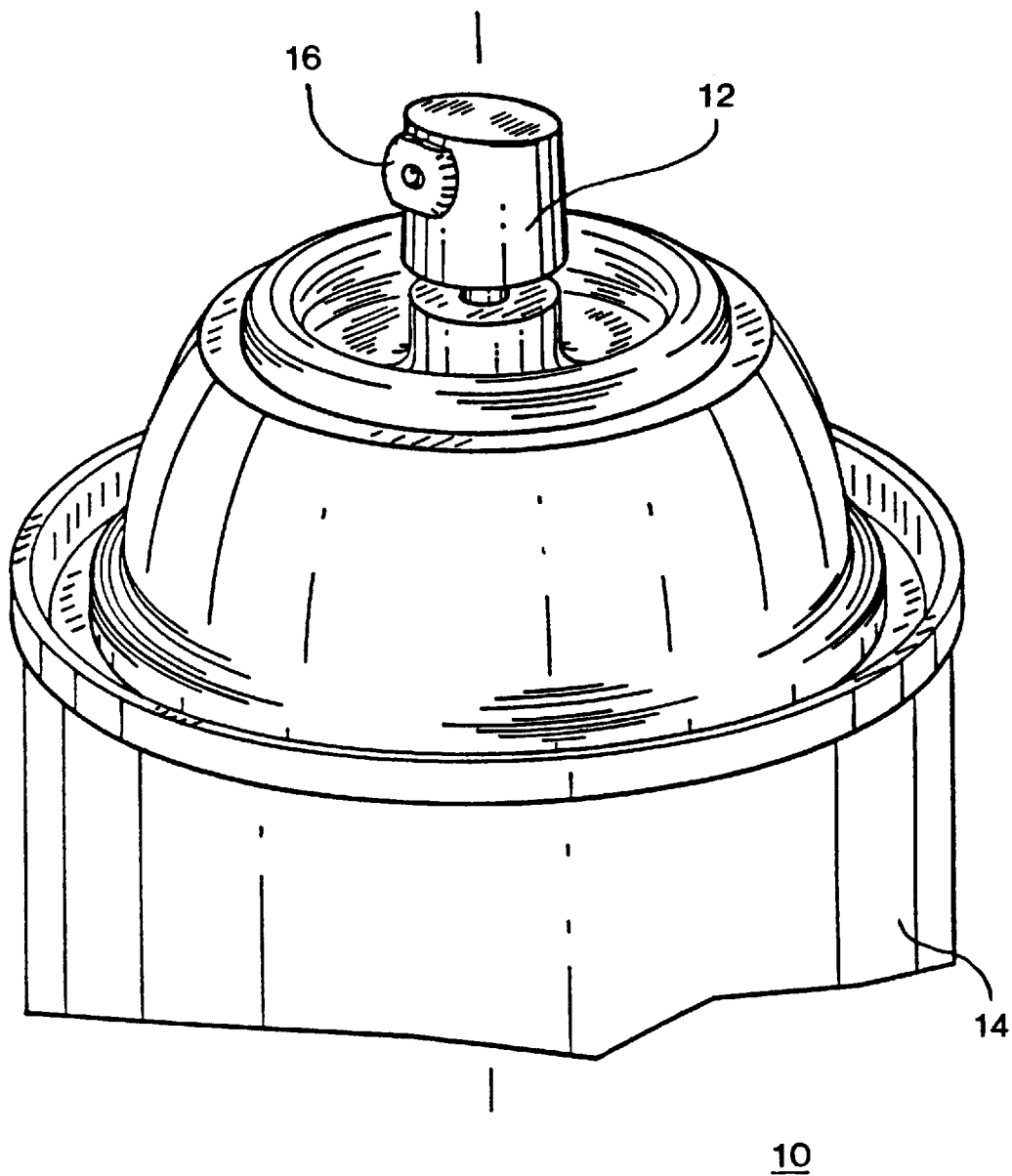
FIG. 1 is partial perspective view of a spray dispenser according to the invention.

According to the invention, a multiple hole, preferably a two hole spray dispensing system and a sprayer in which colliding streams of viscous fluid are dispensed to the atmosphere are provided. The spray dispenser according to the invention includes a reservoir for storing a viscous liquid product. An aerosol or manually pressurized dispensing system preferably a hand held dispensing system may be used to draw liquid from the reservoir. Liquid is delivered from the reservoir under pressure to a delivery passageway. An injection molded nozzle having two or more outlets to the atmosphere is mounted to the delivery passageway to provide colliding streams of liquid.

The nozzle has a nozzle inlet passageway which terminates in a shaped surface formed by intersecting faces for example a cone shape surface or wedge shaped surface formed by intersecting planes. Two tapered passageways are located on opposite sides of the shaped surface. Tapered passageway inlets provide fluid communication between the tapered passageway and the nozzle inlet passageways. Nozzle outlets are located on the tapered passageway end opposite the inlets of the tapered passageways for discharge of pressurized liquid in colliding streams. The viscous liquid exiting from one orifice collides at a preselected collision point with the viscous liquid exiting from the other orifice.

In another aspect of the invention, a method of manufacture of a single piece nozzle having two outlets which produce colliding outlet streams is provided. In addition according to the invention, a mold for making a multiple outlet spray nozzle having colliding exit streams is provided.

In another aspect of the invention, a dispensing system for spraying viscous liquids is provided. The dispensing system according to the invention delivers viscous liquids in a fine mist with improved distribution and a reduction in the areas of undesirable high concentration spots. In addition, the nozzle according to the invention can be manufactured by injection molding in a single piece without the use of expensive pins or without drilling.

Preferably, the liquid to be sprayed is a highly viscous liquid, having a viscosity of above 60 cps, preferably from 60 cps to 100 cps, most preferably from 70 cps to 85 cps. The spray dispensing system according to the invention is useful with numerous different systems for delivery of pressurized liquid to a delivery passageway. A hand held spray dispenser such as an aerosol, a hand pump or a finger pump sprayer can be used. Optionally, a bladder type sprayer can be used.

Many different types of viscous liquids can be dispensed in a fine mist in the spray dispensing system according to the invention. Viscous organic liquids, particularly vegetable oil and/or vegetable oil, lecithin compositions are particularly useful. Such products generally have a viscosity of about 60 cps and above, and are considered difficult to spray dispense. Preferably, the viscosity is from about 60 cps to about 100 cps, desirably from about 60 cps to about 85 cps and most preferably from about 70 cps to about 85 cps. Additionally, other viscous liquids may be used such as paint pigments in linseed oil, viscous petroleum products, lubricants, adhesives and/or resins. Resins include hairspray and other viscous resins.

Figure 2:
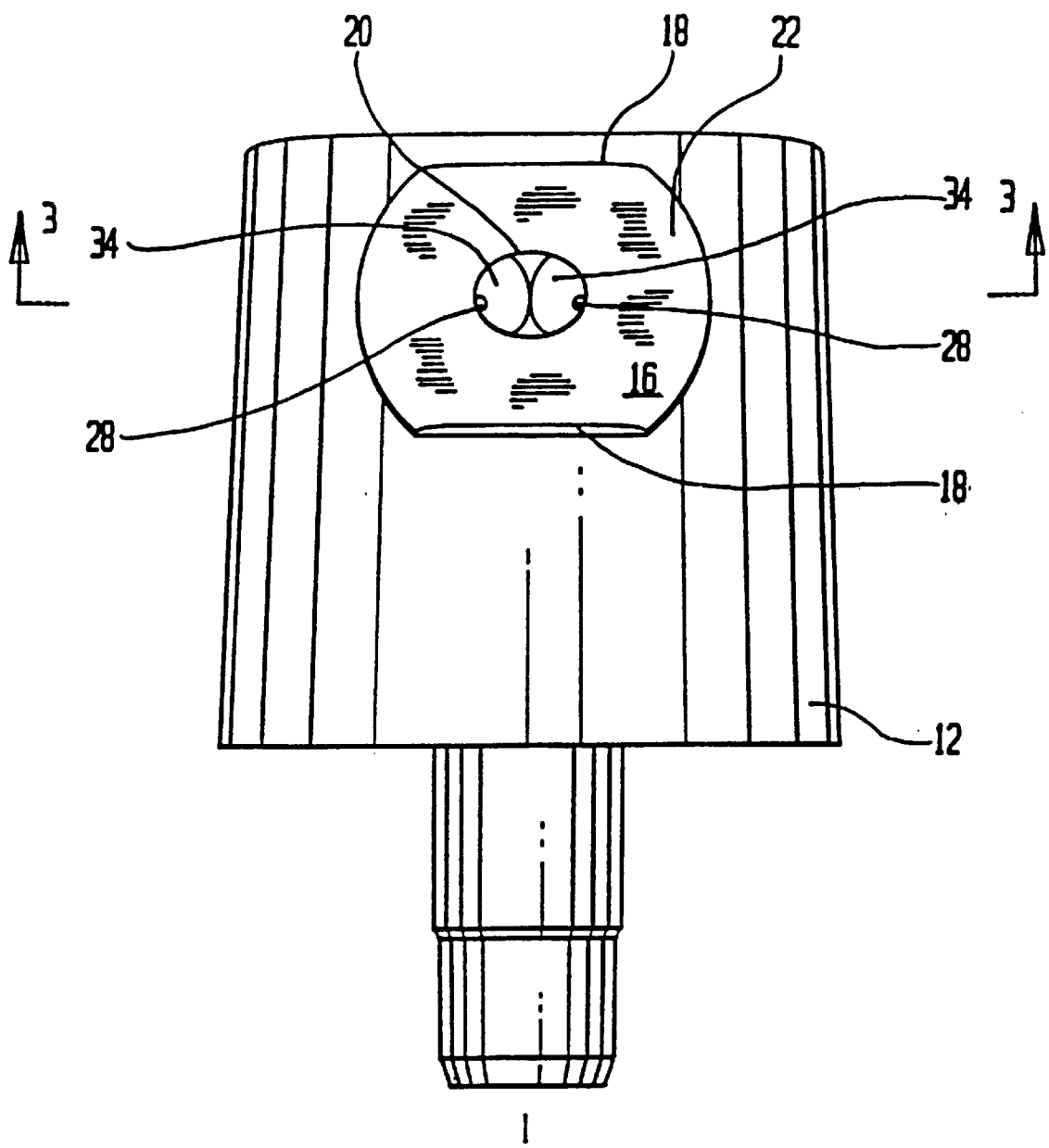
FIG. 2 is a partial front view of FIG. 1 showing an activator of the spray dispenser according to the invention.
Figure 3:
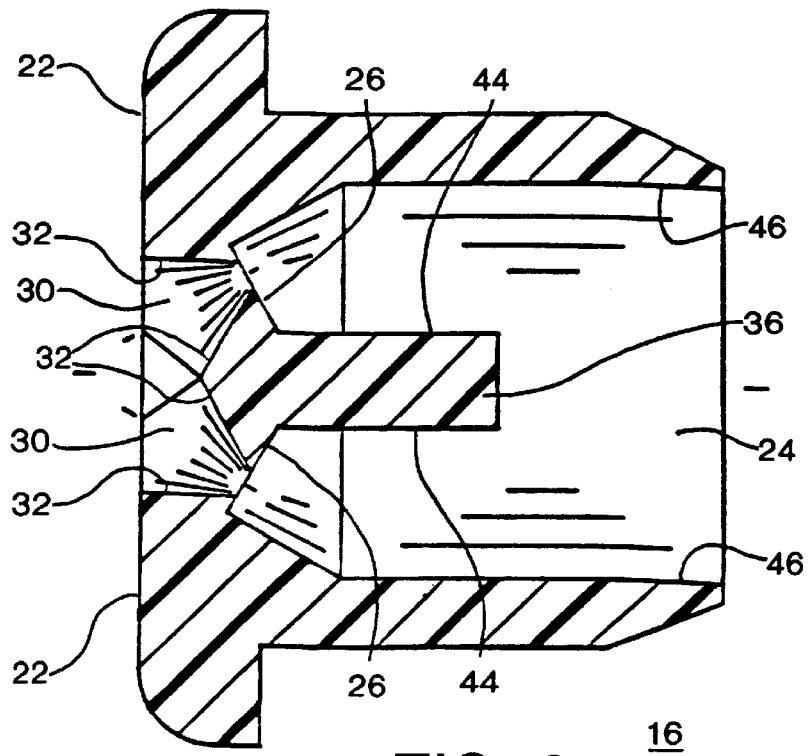
FIG. 3 is a sectional view through 3—3 of FIG. 2.
Figure 3A:
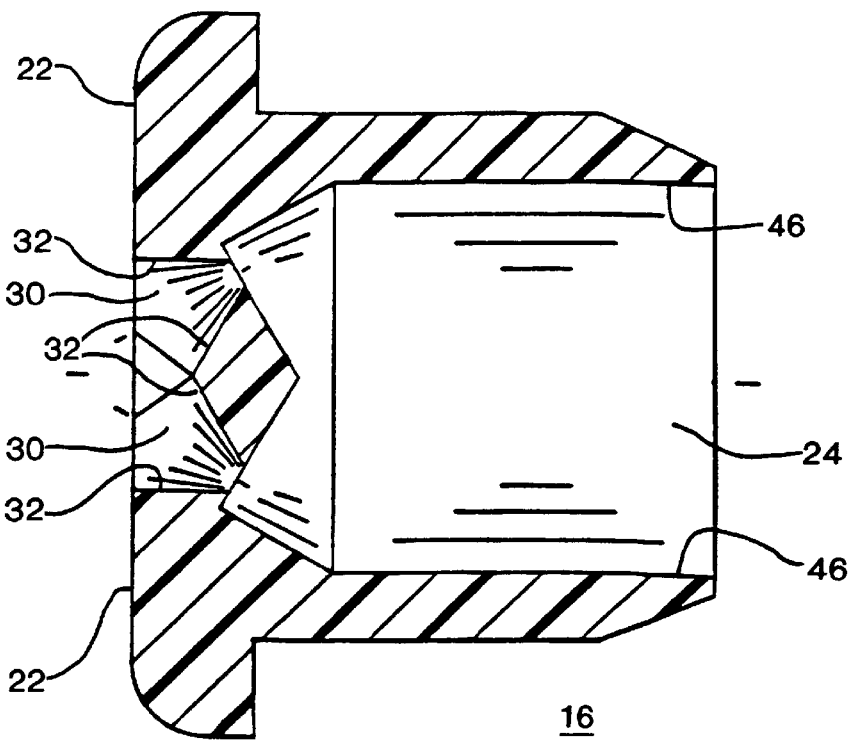
FIG. 3A is a sectional similar to FIG. 3 of an alternative embodiment according to the invention.
Figure 4:
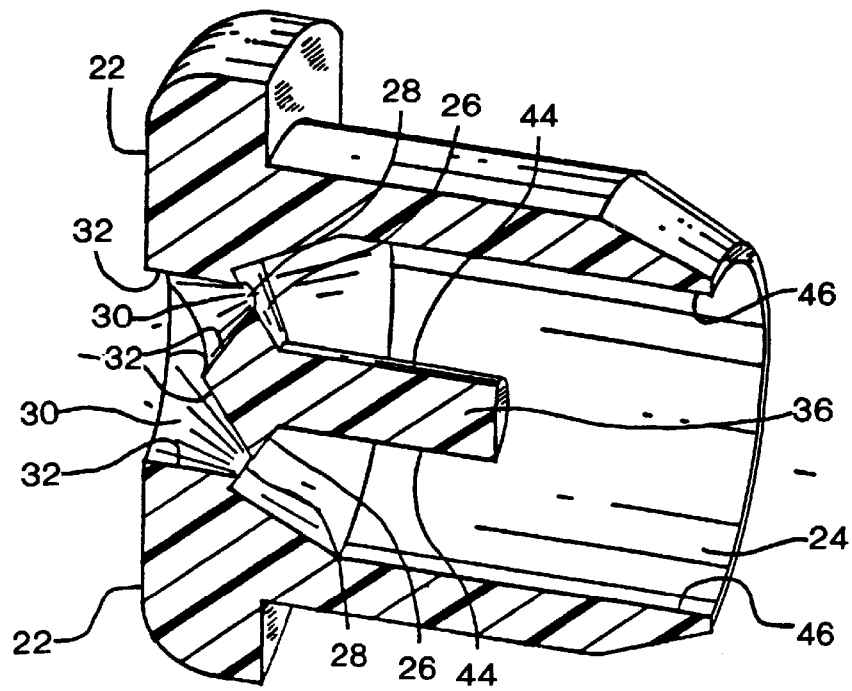
FIG. 4 is an isometric view of FIG. 3.
Figure 4A:
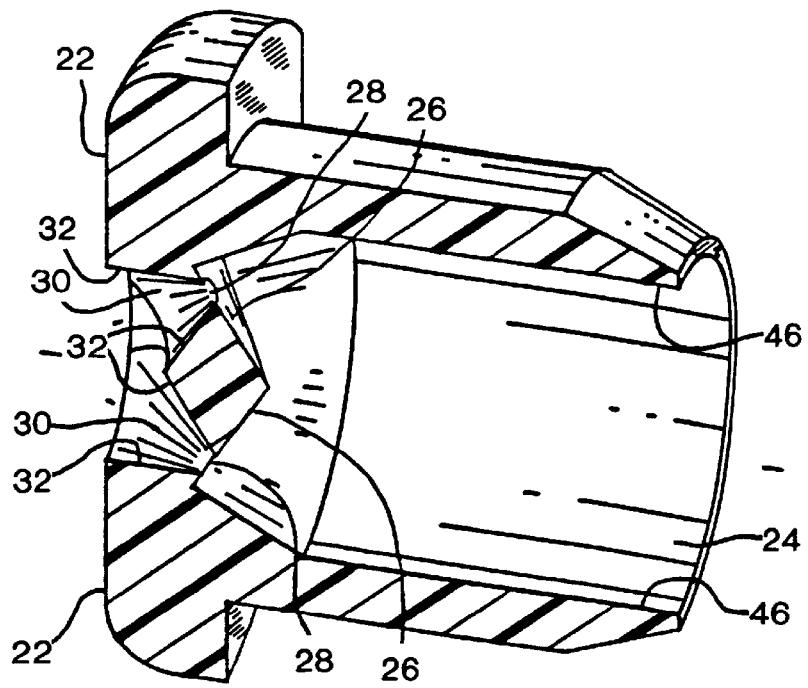
FIG. 4A is an isometric view of FIG. 3A.
Figure 4B:
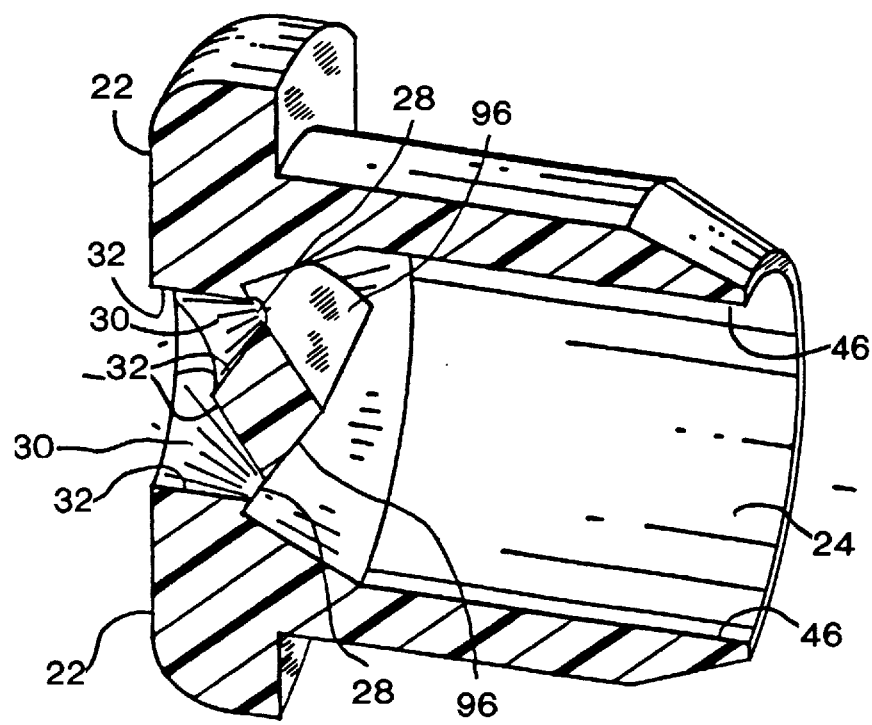
FIG. 4B is an isometric similar to FIG. 4A of an alternative embodiment according to the invention.
Figure 5:
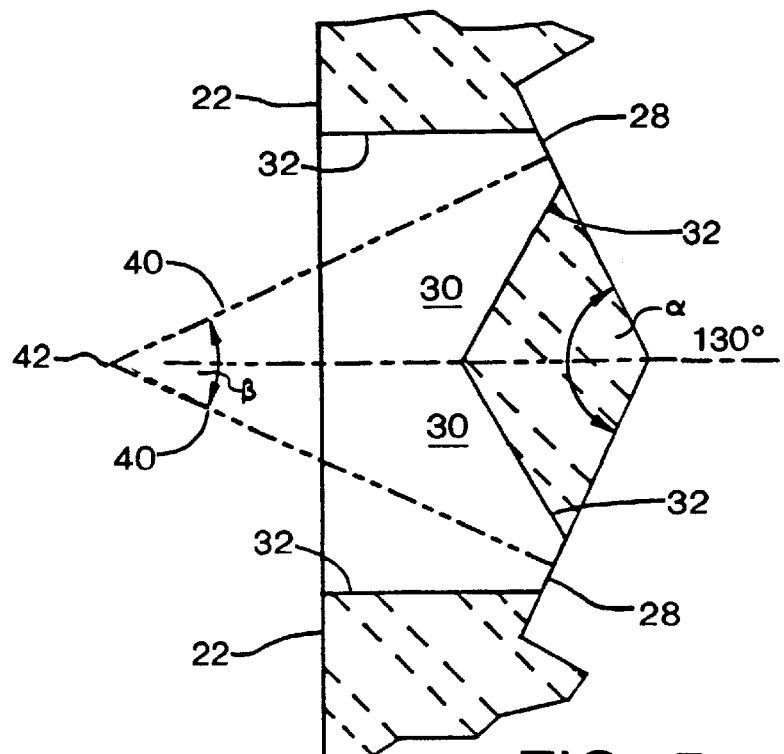
FIG. 5 is a line drawing showing the intersecting streams according to the invention.
Figure 6:
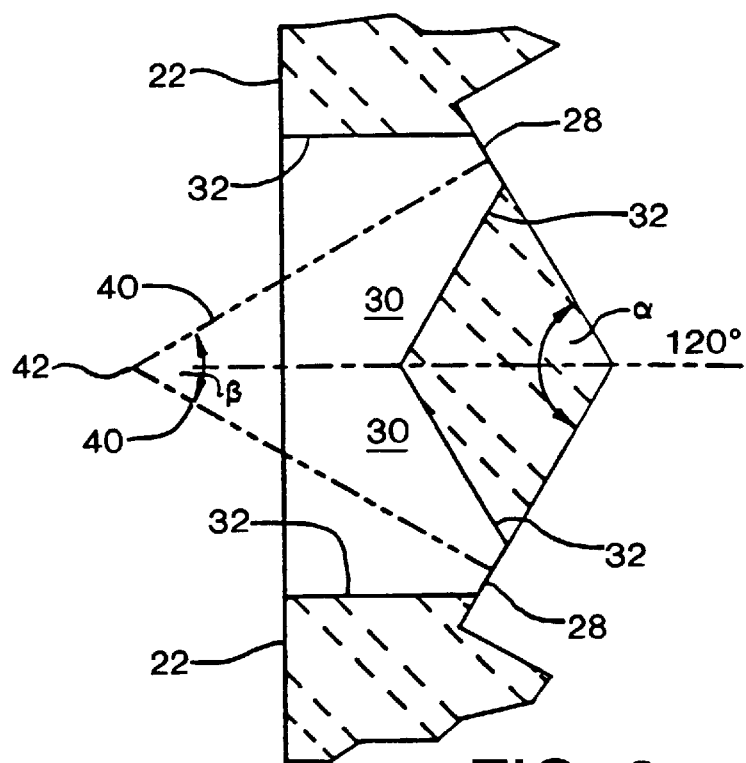
FIG. 6 is a line drawing of an alternative embodiment showing the intersecting streams according to the invention.

Referring to the drawings as best seen in the FIGS. 1 through 11, a spray dispenser according to the invention is provided. Desirably an aerosol spray dispenser or a hand pump dispenser for example a trigger hand pump dispenser or a finger pump dispenser is provided. Optionally, as best seen in FIGS. 1 through 6, an aerosol spray dispenser 10 is provided. The dispenser 10 includes an aerosol button 12 which has a nozzle 16 having two outlets 34. Pressurized viscous liquid is contained in reservoir 14. Nozzle 16 has nozzle flats 18. The nozzle 16 fits into a recess provided in aerosol button 12 for dispensing a viscous liquid when the aerosol button 12 is activated. As best seen in FIGS. 2 to 4, according to the invention, a moldable nozzle 16 preferably moldable by injection molding is provided which has two nozzle outlets 34 which dispense viscous liquid in intersecting streams to the atmosphere. The nozzle 16 includes a nozzle inlet passageway 24 for the delivery of viscous fluid from reservoir 14 on the activation of aerosol button 12. Nozzle inlet delivery passageway 24 terminates in a shaped surface formed by intersecting faces preferably a cone shaped surface 26 at its outlet end as seen FIG. 4A. Alternatively, as shown in the embodiment of FIG. 4B, nozzle inlet delivery passageway 24 terminates in wedge shaped surface 96. Tapered passageways 30 are provided for delivery of viscous liquid from the delivery passageway to the nozzle outlets 34. Tapered passageway inlets 28 are provided for delivering viscous liquid to the tapered passageways 30. Tapered passageway inlets 28 are located on opposite sides the cone shaped surface 26 as seen in FIG. 4A or in wedge shaped surface 96 as seen in FIG. 4B. Preferably tapered passageway inlets 28 have a smaller diameter than the nozzle outlets 34. Desirably the tapered passageways 30 expand from the tapered passageway inlet 28 to the tapered passageway outlets 34. Desirably the tapered passageway outlets 34 are from 2 to 10 times large for example about 5 times larger than the tapered passageway inlet 28 with the passageways 30 expanding at uniform rate between the relatively small inlet and relatively large outlet. Optionally as best seen in FIGS. 3 and 4 a post 36 is provided to reduce the size of passageway 24 at its outlet end. In operation, fluid is delivered in the embodiment of FIGS. 3 and 4 through nozzle inlet passageway 24 from the reservoir 14. As shown preferably post 36 can be provided within passageway 24 to reduce the size of nozzle inlet passageway 24. FIGS. 3A, 4A and 4B show alternative embodiments without a post. The pressurized viscous liquid flows to the end of passageway 24 which terminates in cone shaped surface 26 which includes tapered passageway inlets 28. As shown in FIGS. 3, 3A, 4 and 4A tapered passageway inlets 28 are located on opposite sides of the cone shaped surface 26 and are connected to tapered passageways 30. The viscous liquid flows through the tapered passageways 30. The tapered passageway 30 flares outwardly from the inlet to the outlet end of the passageway. The tapered passageways flare outwardly a sufficient amount so that the fluid does not expand to the outerwalls of the tapered passageways. As a result of the high viscosity of the liquid in the tapered passageway, the liquid will maintain substantial stream integrity while its travels through the tapered passageways 30. The viscous liquid then exits the nozzle outlets 34 as best shown in FIGS. 5 and 6. The resulting exiting viscous fluid is delivered to the atmosphere in two intersecting exit streams 40 which collide at a collision point 42 either exterior or interior to the nozzle 16, preferably the exiting streams 40 collide at a point exterior to the termination of the nozzle 16. Preferably at a point exterior to nozzle face 22.

As best seen in FIGS. 3, 3A, 5 and 6, viscous liquid enters through tapered passageway inlets 28 and flows through tapered passageways 30 and exits in intersecting exit streams 40 to collide at a collision point 42. The tapered passageways 30 expand at a rate faster than does the fluid flowing so that there is no side confinement of the fluid by the tapered passagewalls 32. Generally the fluid is delivered to inlet 28 under high pressure from the reservoir 14. The viscous liquid generally maintains a stream integrity as it flows through tapered passageways 30. Hence there is minimal frictional drag as a result of there being no substantial channel confinement of the fluid. The fluid exits at the nozzle outlets 34 at a higher velocity then it would if it had to flow through a small confined channel. The angle $\alpha$ of the shaped surface e.g. a cone or wedge shaped surface is preselected according to the angle of impingement $\beta$ desired in the resulting spray device. Preferably an angle of impingement $\beta$ of about 20 to about 120 degrees is desired. This angle is achieved by controlling the angle $\alpha$ of the cone or wedge shape surface. As shown in FIG. 5 angle $\alpha$ is directly related to the impingement angle $\beta$ of the colliding streams. The exiting fluid stream 40 follows an exiting path at 90 degrees to the cone face 26. The sum of the angle $\alpha$ and $\beta$ totals 180 degrees. Thus for a preselected angle of impingement $\beta$, cone angle $\alpha$ is selected as a 180 degrees minus the desired angle $\beta$. Thus as seen in FIG. 5 for an angle of impingement of 50 degrees, an angle $\alpha$ of 130 degrees is chosen. As shown in FIG. 6 for an impingement angle $\beta$ of 60 degrees, an angle $\alpha$ of 120 degrees is chosen. Desirably angle $\beta$ is from about 40 to about 80 most preferably about 50 degrees to about 60 degrees.

Optionally as best seen in FIGS. 3 and 4, post 36 is a provided to reduce the size of the nozzle inlet passageway 24 prior to the entry of viscous liquid into the tapered passageway inlet 28. The viscous liquid exhibits a large degree of surface tension in a confined space. By reducing the size of the nozzle inlet passageway 24 by the insertion of the post 36, one can control and reduce the velocity of the viscous liquid as it flows through tapered passageway inlet 28 and through the tapered passageways 30 on its path to the atmosphere. Thus if the nozzle inlet passageway 24 is reduced sufficiently, the resulting velocity of the viscous liquid exiting the nozzle 16 can be reduced. Primarily as a result of the surface tension characteristics of the viscous fluid, the viscous liquid will generally maintain a stream integrity as it flows through the tapered passageways 30. The viscous liquid will not fill the entire tapered passageway and instead will flow in a confined stream which is held together by the surface tension of the viscous fluid.

Figure 7:
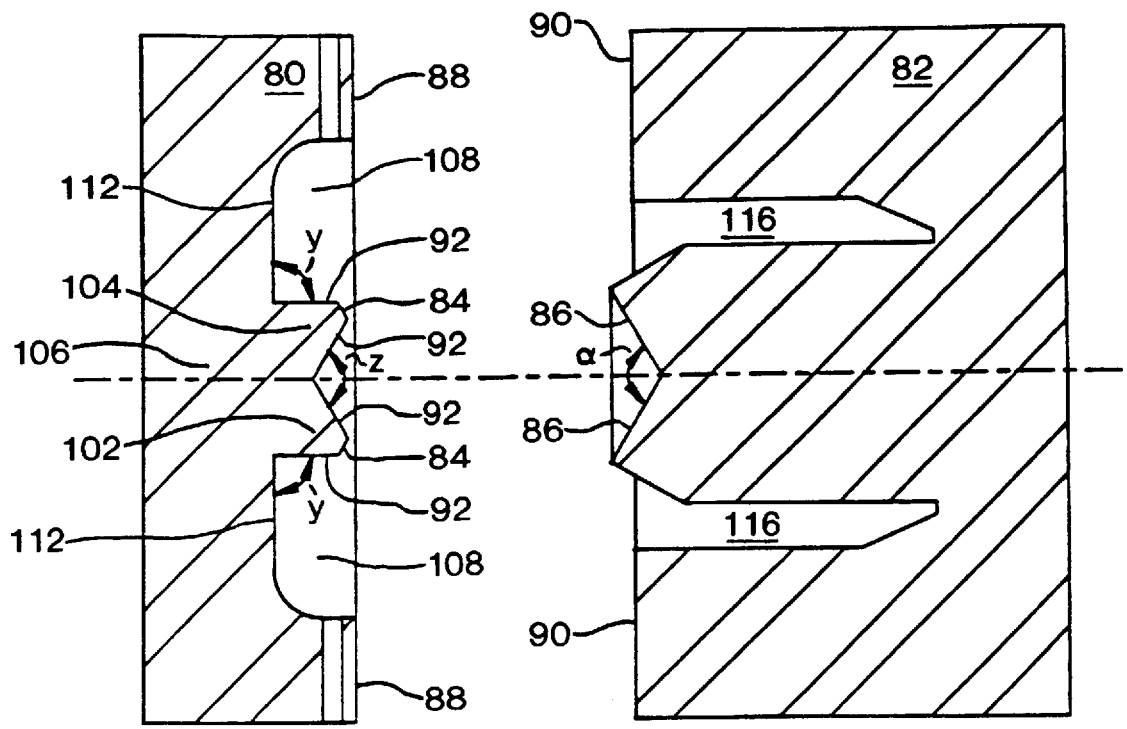
FIG. 7 is a conceptual line drawing of a open mold according to the invention.
Figure 7A:
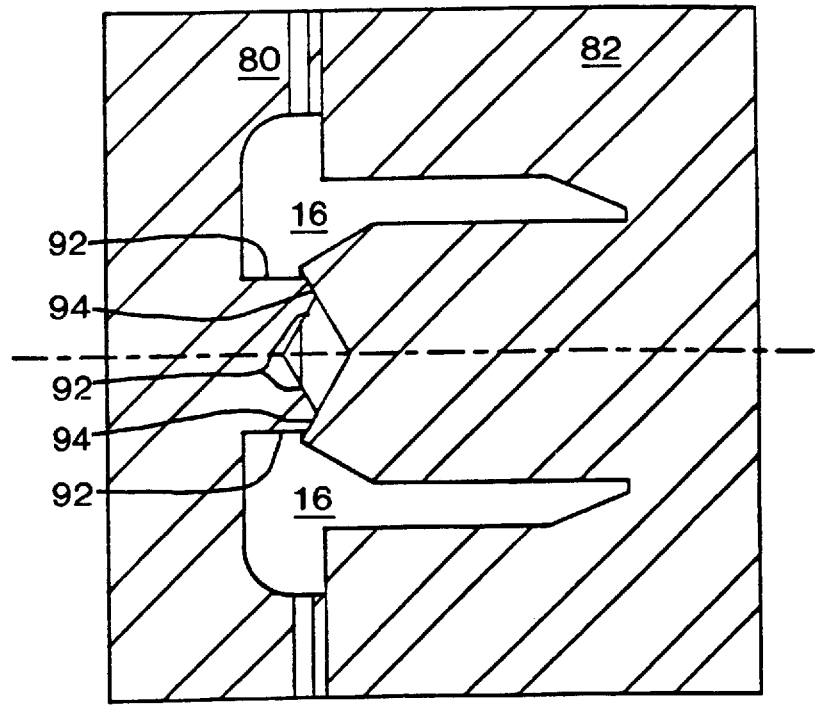
FIG. 7A is a conceptual line drawing of the mold of FIG. 7 in the closed position.
Figure 7B:
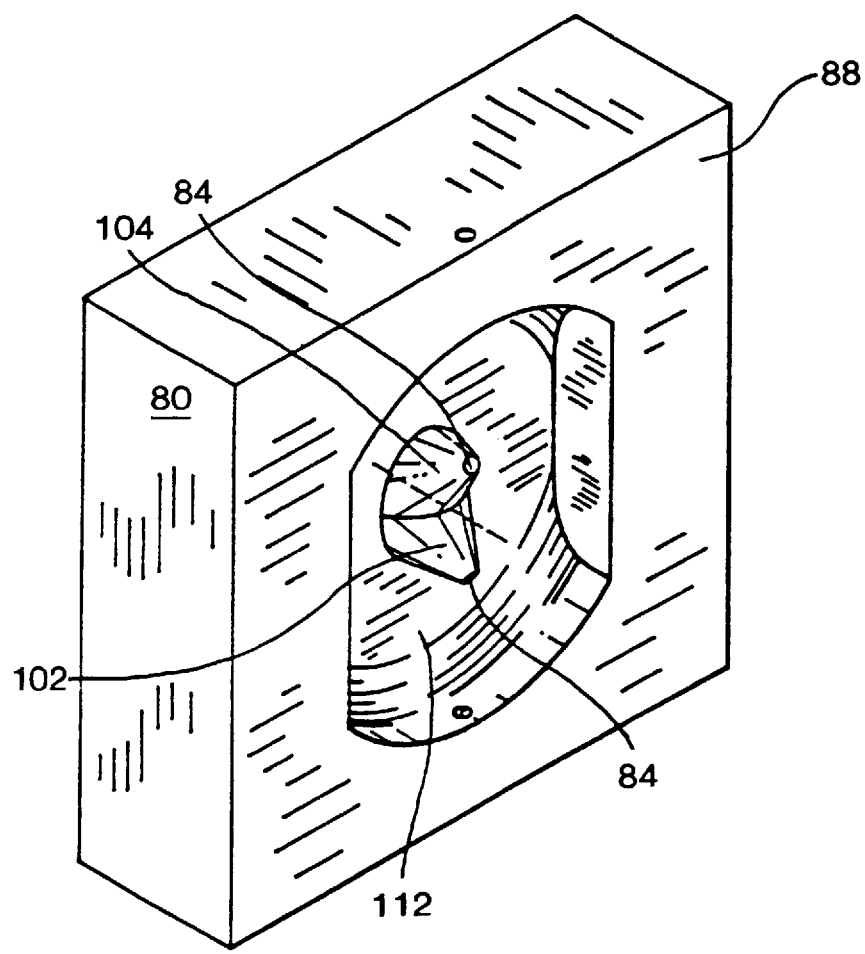
FIG. 7B is an isometric view of the left said of the mold according to the invention.
Figure 7C:
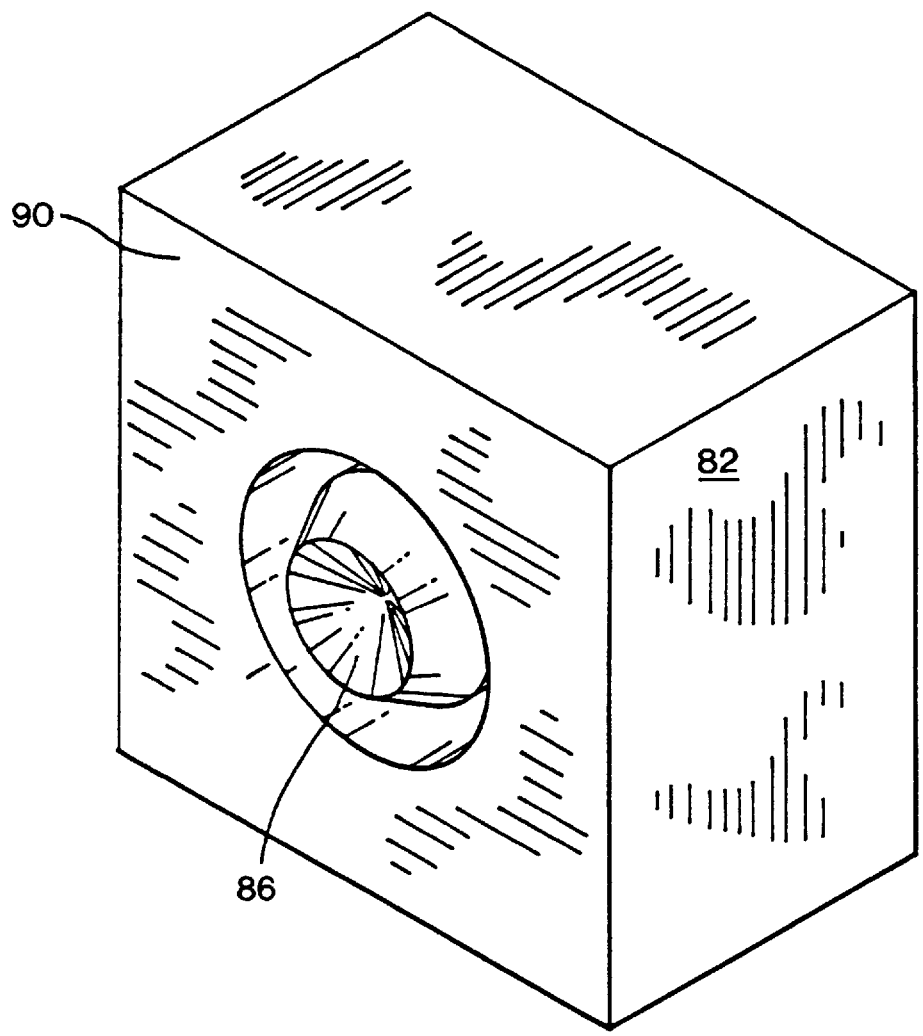
FIG. 7C is an isometric view of the right side mold according to the invention.
Figure 8:
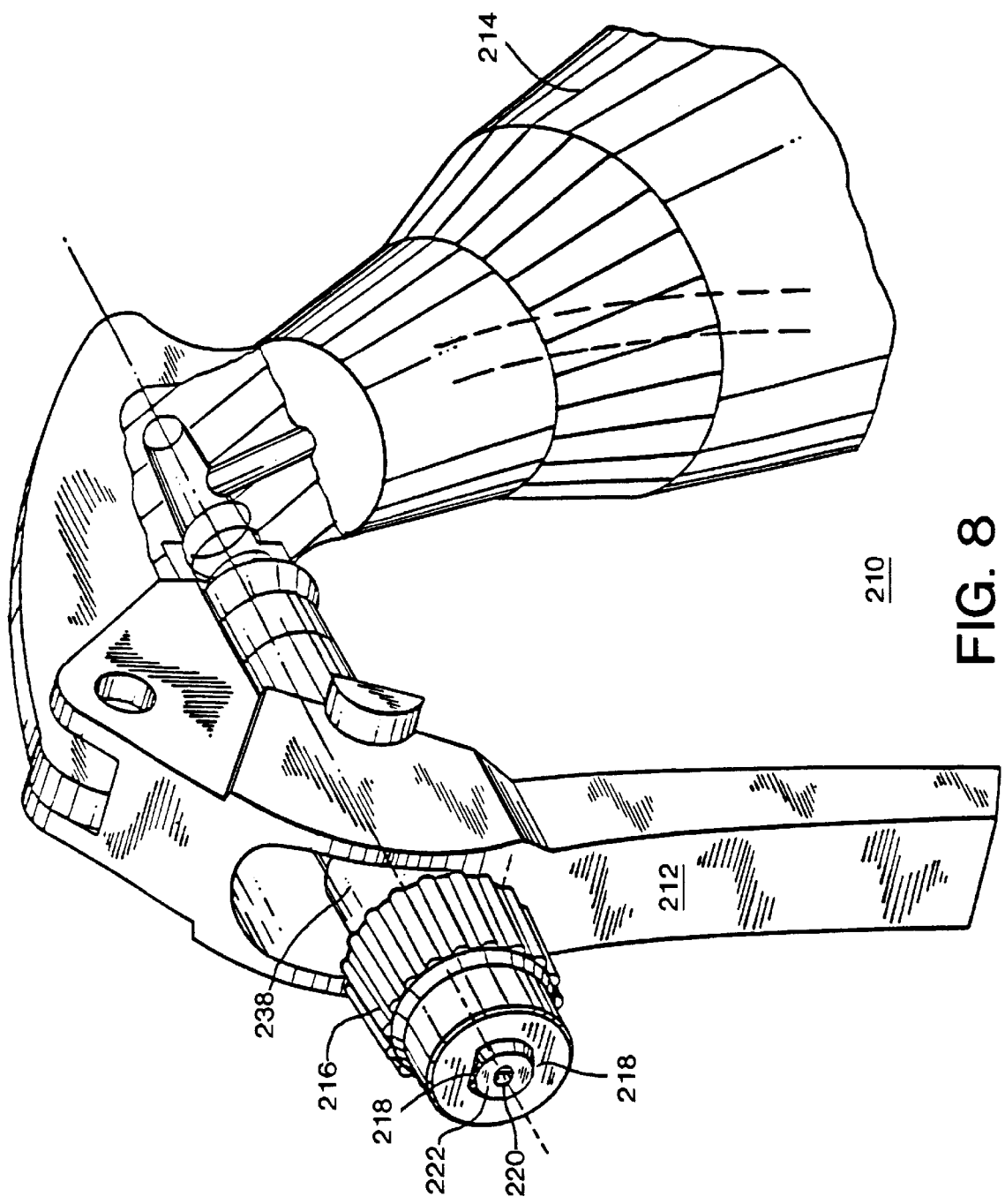
FIG. 8 is a perspective view of a trigger sprayer according to the invention.

According to the invention and as best seen in FIGS. 7, 7A 7B, and 7C, a method of manufacturing a two hole nozzle which in use has intersecting outlets streams, is provided. Preferably a method of injection molding a two hole nozzle is provided. A mold for manufacturing such a nozzle is also provided according to the invention. FIGS. 7 and 7A are conceptual line drawings showing molds for making the nozzle 16 according to the invention. FIGS. 7B and 7C are isometric drawings of the left side and right side of the mold according to the invention. FIG. 7 is a representation of the mold, open prior to any plastic being injected. FIG. 7A shows the mold in the closed position after it has been injected with plastic. As can be seen in FIGS. 7, 7A, 7B and 7C, no pins are used in the formation of the nozzle 16.

Referring to FIG. 7 the mold according to the invention has, a left side 80 and a right side 82 for mating engagement with one another. The left side mold 80 has a first and second shaped projection which form tapered passageways 30 upon injection of the mold with plastic. Preferably the first and second shaped projections are cone shaped projections 102 and 104 and are located adjacent to one another and extend from a common base 106. The projections 102 and 104 form an angle z therebetween on the inner side of the cone shaped projections. Surrounding the shaped projections 102 and 104, a nozzle cavity 108 is provided. The nozzle cavity 108 has a back wall 112. The cone shaped projections 102 and 104 having passageway forming surfaces 92 form an angle y of 90 degrees or greater with the backwall 112. As a result plastic cannot flow behind the cone shaped projections. When the mold is opened, the nozzle is removed without damage. Cone shaped projection 102 and 104 terminate in aperture contacting surfaces 84. Right side mold 82 includes aperture contact surface 86 for mating with aperture contact surface 84 on projections 102 and 104 when the mold is closed. As best seen in FIG. 7C, aperture contact surface 86 has a concave contact surface having a preselected angle $\alpha$. This angle $\alpha$ determines the collision angle $\beta$ in the nozzle. The slope of contact surface 84 corresponds to the slope of concave contact surface 86 on right side mold 82. As discussed above angle $\alpha$ is preselected to provide the collision angle $\beta$ of the nozzle as shown in FIG. 5 and FIG. 6. The relationship of the angle $\alpha$ to the angle $\beta$ is angle $\beta$ equals 180 degrees minus angle $\alpha$. Sealing surface 88 is provided on left side mold 80 and sealing surface 90 is provided on right side mold 82 for sealing the molds together. Body forming cavity 116 forms the side wall of nozzle inlet passageway 24 during injection molding of nozzle 16. Tapered passageway forming surfaces 92 are provided on the sides of projections 102 and 104 and form tapered passageway wall 32 upon filling cavity 108 with plastic during injection molding.

As best seen in FIGS. 7, 7A, 7B and 7C nozzle 16 is formed upon the closing of the left side mold 80 and 82 and right side mold and its filing with plastic. As shown in FIG. 7A, contact point 94 is formed upon the mating of surfaces 84 and 86 which result in the formation of tapered passageway inlet 28 of nozzle 16 upon filing the mold with plastic. Also, as best seen in FIGS. 4A, 5, 6 and 7B, nozzle 16 is formed using molds 80 and 82. The portion of concave surface 86 that is not in contact with aperture contact surface 84 forms cone shaped surface 26 when plastic is injected in the mold. Tapered passageway forming surfaces 92 of projections 102 and 104 form tapered passagewalls 32. As can best be seen in FIGS. 7, 7a, 7B and 7C upon the separation of left side mold 80 from the right side mold 82, molded nozzle 16 can be removed without any mold interference. As a result a nozzle having two discharge outlets for discharging atomized liquid in colliding streams is provided in a single piece without the necessity of using molding pins. As best seen in FIGS. 1 and 2, nozzle 16 has a flat nozzle face 22 and a exit oval 20 which is in fluid communication with the outlets 34 of tapered passageways 30. The nozzle 16 has nozzle flats 18 for orienting the nozzle 16 in button 12 in a preselected position. Preferably the nozzle should be oriented with the flats in a horizontal position.

Figure 9:
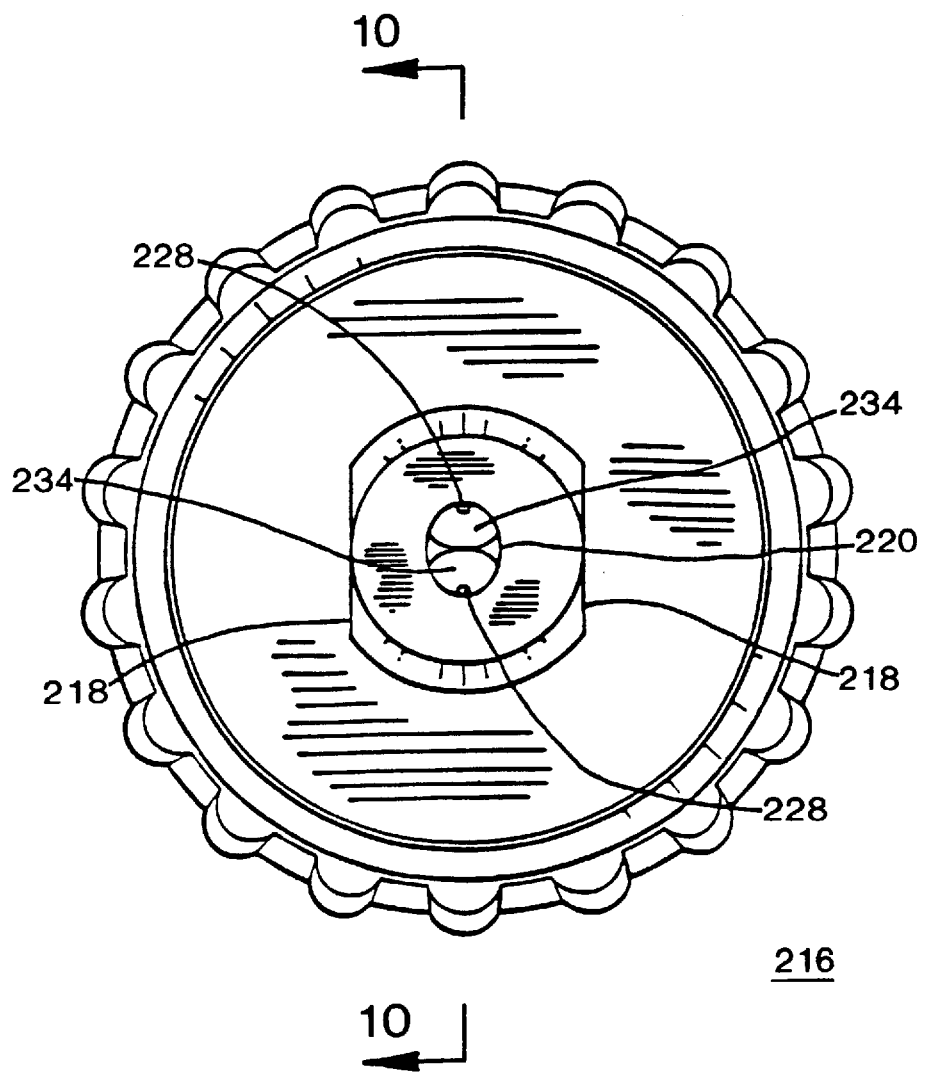
FIG. 9 is a partial front view of FIG. 8 showing a nozzle according to the invention.
Figure 10:
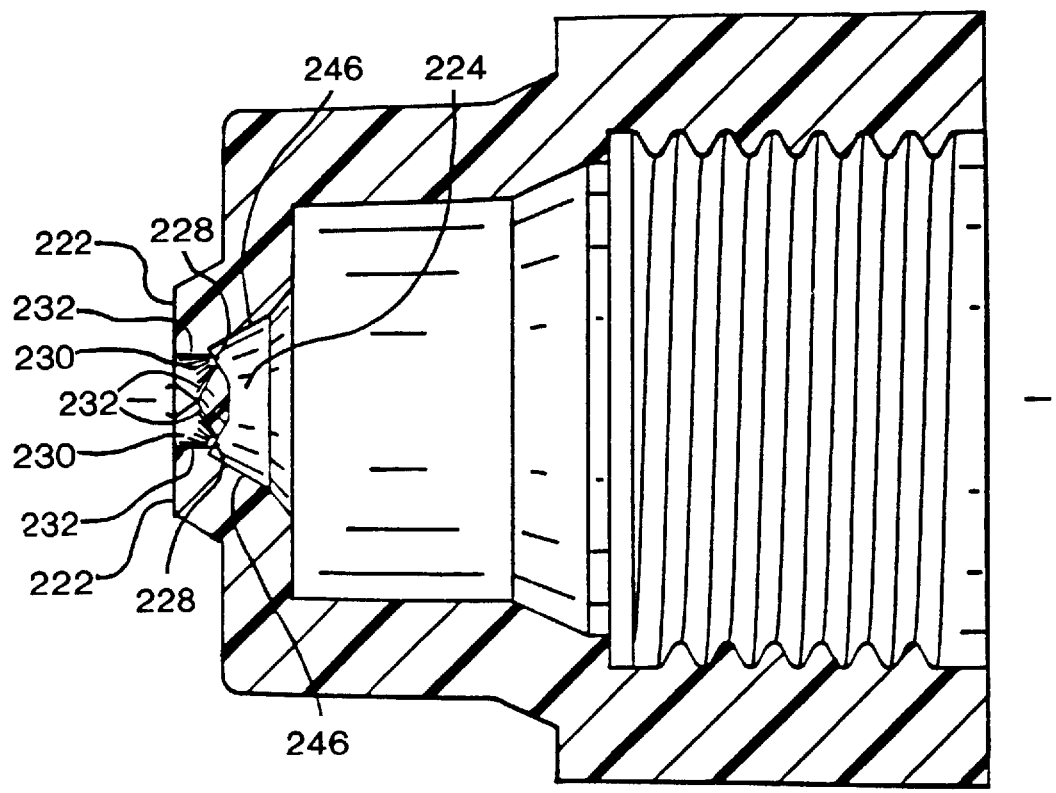
FIG. 10 is a section through 10—10 of FIG. 9.
Figure 11:
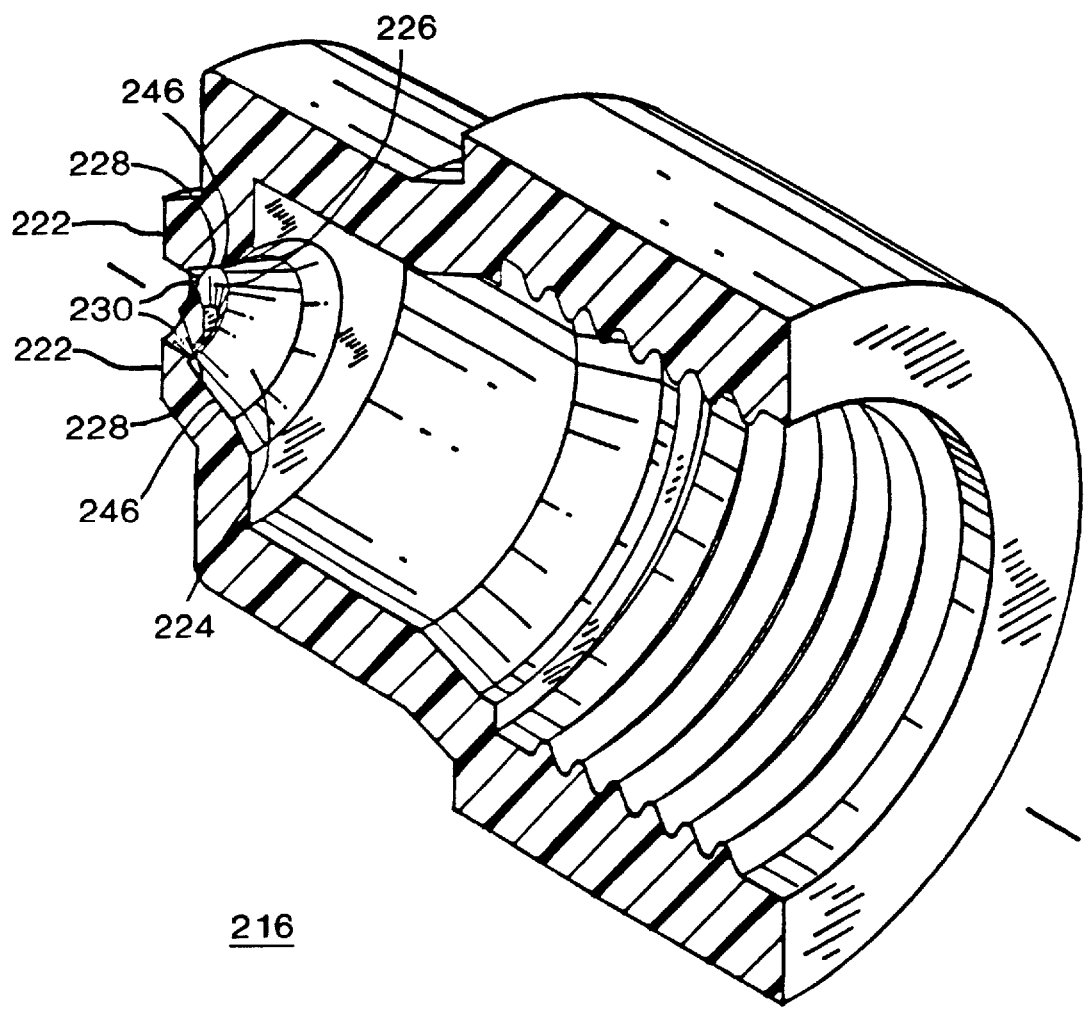
FIG. 11 is an isometric view of FIG. 10.
Figure 11A:
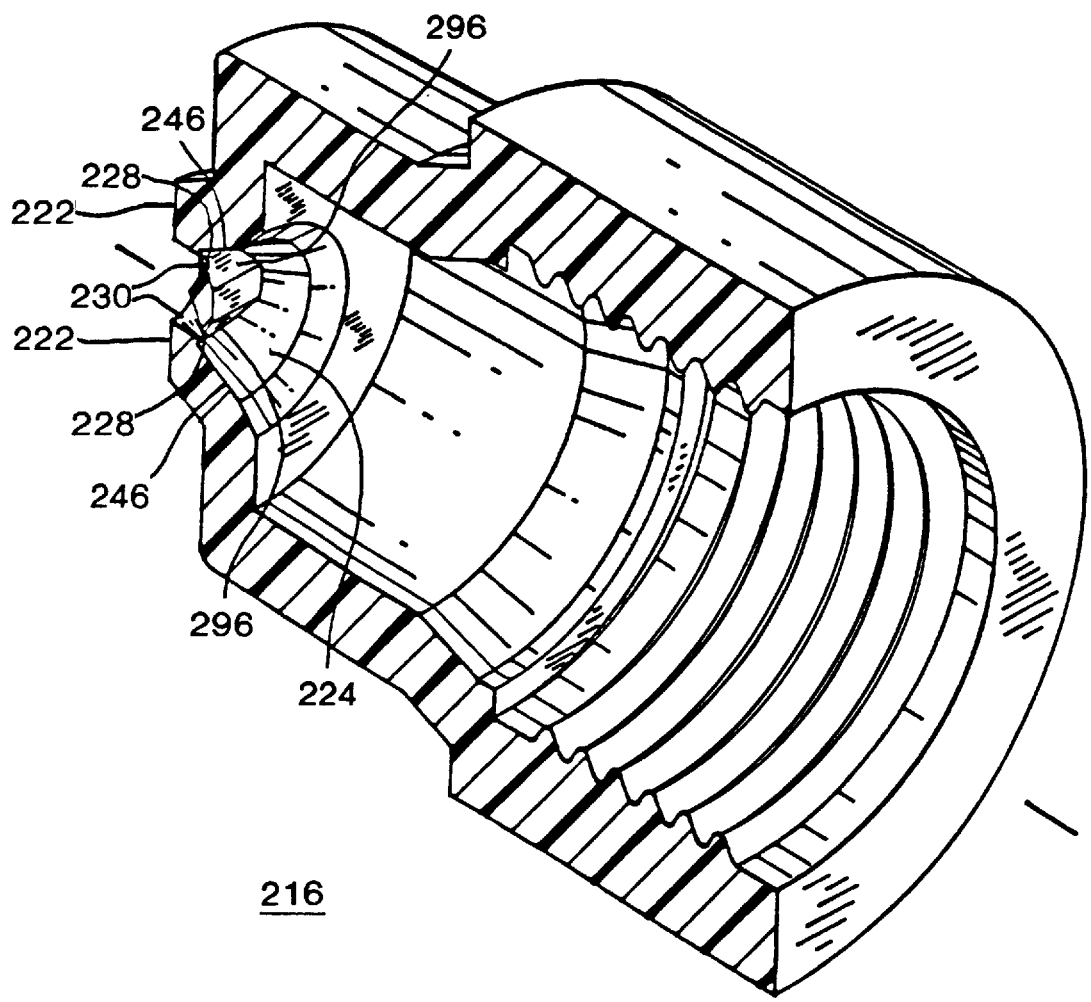
FIG. 11A is an isometric view of FIG. 10A.

According to the invention, a hand pump sprayer is provided as best seen in FIGS. 8 through 11A. A hand pump sprayer preferably trigger sprayer 210 having a molded nozzle 216 having two outlets 234 made according to the invention is provided. Viscous liquid is contained in reservoir 214. Nozzle 216 has nozzle flats 218. The nozzle 216 fits on a plunger 238 for dispensing a viscous liquid under pressure when the trigger 212 is activated. As best seen in FIGS. 9 to 11 according to the invention, a moldable nozzle 216, preferably molded by injection molding, is provided which has two nozzle outlets 234 which dispense vicious liquid in intersecting streams to the atmosphere. The nozzle 216 includes a nozzle inlet passageway 224 for the delivery of viscous liquid from reservoir 214 on the activation of trigger 212. Nozzle inlet delivery passageway 224 terminates in a shaped surface preferably cone shape surface 226 as seen in FIG. 11. Alternatively as shown in FIG. 11A nozzle inlet delivery passageway 224 terminates in wedge shaped surface 296. Tapered passageways 230 are provided for delivery of viscous liquid from the nozzle delivery passageway 224 to the nozzle outlets 234. Tapered passageway inlets 228 are provided for delivering viscous liquid to the tapered passageways 230. Tapered passageway inlets 228 are located on opposite sides the cone shaped surface 26. Preferably tapered passageway inlets 228 have a smaller diameter than nozzle outlets 234. Desirably the tapered passageway 230 expand from the tapered passageway inlet 228 to the tapered passageway outlet 234.

Figure 10A:
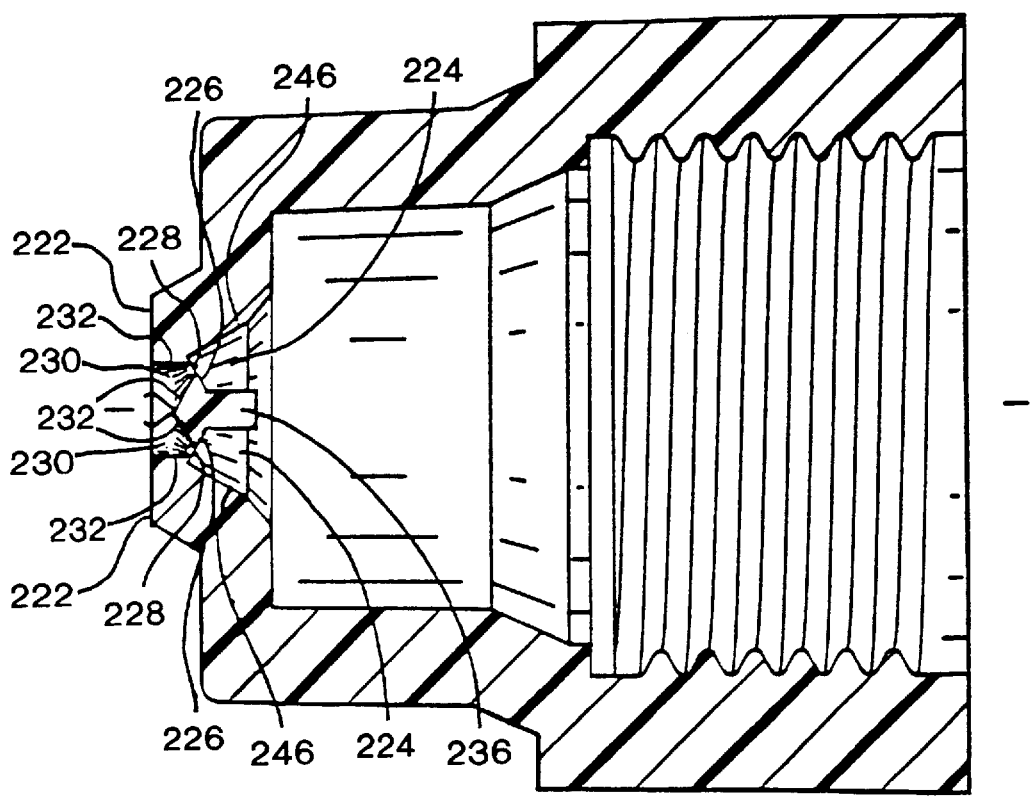
FIG. 10A is a section view similar to FIG. 10 of an alternative embodiment according to the invention.

In operation, fluid is delivered through nozzle inlet passageway 224 from the reservoir 214. Optionally as shown in FIG. 10A, post 236 can be provided within passageway 224 from the reservoir 214. Upon activating trigger 212, pressurized viscous liquid flows to the end of passageway 224 which terminates in cone shaped surface 226 or optionally as best seen in FIG. 11A in wedge shape surface 296. Cone shape surface 226 includes tapered passageway inlets 228. Tapered passageway inlets 228 are located on opposite sides of the cone shaped surface 226 and are connected to tapered passageways 230. The viscous liquid flows through the tapered passageways 230. The tapered passageways 230 expands from the inlet 228 to the outlet 234. The tapered passageways flare outwardly a sufficient amount so that the fluid does not expand to the outerwalls of the tapered passageways. As a result of the high viscosity of the liquid in the tapered passageway, it will maintain substantial stream integrity while its travels through the tapered passageways 230. The viscous liquid then exits the nozzle outlets 234. The resulting exiting viscous liquid is delivered to the atmosphere in two intersecting exit streams which collide at a collision point either exterior or interior to the nozzle 216, preferably the exiting streams collide at a point exterior to the termination of the nozzle 216. Preferably at a point exterior to nozzle face 222.

The foregoing is considered as illustrative only to the principles of the invention. Further, since numerous changes and modifications will occur to those skilled in the art, it is not desired to limit the invention to the exact construction and operation shown and described above, and accordingly all suitable modifications and equivalents may be resorted to, falling within the scope of the invention.

We claim:

1. A spray dispenser for dispensing and atomizing viscous liquid comprising;
    a) a single reservoir for storing viscous liquid;
    b) means to deliver viscous liquid under pressure from said reservoir to a delivery passageway;
    c) a nozzle having a first and second nozzle outlets providing intersecting streams of viscous liquid during dispensing; said nozzle including:
        a nozzle inlet passageway in said nozzle;
        said nozzle inlet passageway terminating in a projecting surface formed by intersecting faces having a preselected angle α therebetween to direct the streams of viscous liquid on an intersecting path through said nozzle outlets;
        a first and second tapered passageway having an inlet and outlet end in fluid communication with said nozzle inlet passageway said first and second tapered passageway extending from said projecting surface to said nozzle outlets;
        a first tapered passageway inlet located on a side of said projecting surface to deliver liquid from said nozzle inlet passageway to said first tapered passageway;
        a second tapered passageway inlet located on the opposite side of said projecting surface from said first tapered passageway inlet to deliver viscous liquid from said nozzle inlet passageway to said second tapered passageway;
        said first and second tapered passageways forming at the outlet end of said first and second tapered passageway said first and second nozzle outlets; said first and second nozzle outlets having larger diameter than said first and second tapered passageway inlet.

2. A spray dispenser according to claim 1 wherein said angle α is between about 60 degrees to 160 degrees.

3. A spray dispenser according to claim 1 wherein the angle α is between about 120 degrees and about 140 degrees.

4. A spray dispenser according to claim 1 wherein angle α is about 120 degrees.

5. The spray dispenser according to claim 1 further comprising a post centrally located in said nozzle inlet passageway.

6. A spray dispenser according to claim 1 wherein said tapered passageways has an inlet diameter and outlet diameter said outlet diameter being from about 10 to 2 times the inlet diameter.

7. A spray dispenser according to claim 1 wherein said projecting surface is cone shaped.

8. A spray dispenser according to claim 1 wherein said projecting surface is wedge shaped.

9. A spray dispenser according to any one of claims 1 to 8 wherein said spray dispenser is a hand held sprayer.

10. A spray dispenser according to claim 9 wherein said spray dispenser is an aerosol spray dispenser.

11. A spray dispenser according to claim 10 further comprising a compressed gas propellant.

12. A spray dispenser according to claim 11 wherein said compressed gas is selected from the group consisting of carbon dioxide, nitrous oxide and nitrogen.

13. A spray dispenser according to claim 11 wherein said nozzle has been injection molded without the use of molding pins.

14. A spray dispenser according to claim 13 wherein said nozzle is a single piece injection molded nozzle.

15. A spray dispenser according to claim 9 wherein said spray dispenser is a trigger type hand pump sprayer.

16. A spray dispenser according to anyone of claims 1 to 8 wherein said nozzle has been injection molded without the use of molding pins.

17. A spray dispenser according to claim 13 wherein said nozzle is an injection molded one piece nozzle.

18. A spray dispensing system for dispensing viscous liquids having a viscosity of about 60 cops or greater comprising:
  a) a viscous liquid having a viscosity of about 60 cops or greater;
  b) a single reservoir for holding said viscous liquid for dispensing;
  c) means to deliver viscous liquid under pressure from said reservoir to a delivery passageway;
  d) a nozzle having a first and second nozzle outlets; viscous liquid exiting said nozzle outlets in intersecting streams of viscous liquid during dispensing; said nozzle including:
    a nozzle inlet passageway in said nozzle;
    said nozzle inlet passageway terminating in projecting surface formed by intersecting faces to direct streams of viscous liquid on an intersecting path through side nozzle outlets;
    a first and second tapered passageway having an inlet and outlet end in fluid communication with said nozzle inlet passageway said first and second tapered passageway extending from said projecting surface to said nozzle outlets;
    a first tapered passageway inlet located on a side of said projecting surface to deliver viscous liquid from said nozzle inlet passageway to said first tapered passageway;
    a second tapered passageway inlet located on the opposite side of said projecting surface from said first tapered passageway inlet to deliver viscous liquid from said nozzle inlet passageway to said second tapered passageway;
    said first and second tapered passageways forming at the outlet end of said first and second tapered passageway said first and second nozzle outlets; said first and second nozzle outlets having a larger diameter than said first and second tapered passageway inlet.

19. A spray dispensing system according to claim 18 wherein said projecting surface is a cone shape surface.

20. A spray dispensing system according to claim 18 wherein said projecting surface is a wedge shaped surface.

21. A spray dispensing system according to claim 18 wherein the viscosity of said viscous liquid is about 60 cps to about 100 cps.

22. A spray dispensing system according to claim 18 wherein the viscosity of said viscous liquid is about 70 cps to about 85 cps.

23. The spray dispensing system according to any one of claims 18 to 22 wherein said viscous liquid is vegetable oil.

24. The spray dispensing system according to claim 23 further comprising an aerosol spray dispenser.

25. A spray dispensing system according to claim 24 further comprising a compressed gas.

26. A spray dispensing system according to claim 25 wherein the compressed gas is selected from the group of carbon dioxide, nitrous oxide and nitrogen.

27. A spray dispensing system according to claim 23 further comprising trigger type hand pump sprayer.

28. The spray dispensing system according to any one of claims 18 to 22 wherein said viscous liquid is selected from the group of paint pigments in linseed oil, petroleum products, lubricants, adhesive and resins.

29. A spray dispensing system according to claim 28 wherein the viscous liquid is an adhesive.

* * * * *